United States Patent [19]

Kitamura et al.

[11] Patent Number: 4,504,870
[45] Date of Patent: Mar. 12, 1985

[54] AUTOMATIC LEVEL ADJUSTMENT WITH MEANS FOR MINIMIZING DROP-OUT EFFECTS

[75] Inventors: Masatsugu Kitamura, Atsugi; Mamoru Inami, Yokohama; Yoshiaki Tanaka, Fujisawa; Zenju Otsuki, Tokyo, all of Japan

[73] Assignee: Victor Company of Japan, Ltd., Yokohama, Japan

[21] Appl. No.: 399,571

[22] Filed: Jul. 19, 1982

[30] Foreign Application Priority Data

Jul. 23, 1981 [JP] Japan ................................ 56-115515

[51] Int. Cl.$^3$ ...................... G11B 15/02; G11B 27/36
[52] U.S. Cl. ........................................ 360/25; 360/31; 360/68
[58] Field of Search ................ 360/25, 31, 65, 66, 360/67, 68

[56] References Cited

U.S. PATENT DOCUMENTS 4,258,397 3/1981 Kitamura et al. ................. 360/31

Primary Examiner—Vincent P. Canney
Attorney, Agent, or Firm—Pollock, VandeSande & Priddy

[57] ABSTRACT

A test signal is recorded on a magnetic tape prior to the recording of audio signals and reproduced to allow detection of an average value of the magnitude of the reproduced test signal. A drop-out in the reproduced signal is detected if it occurs during the process of deriving the average value. If the drop-out is not detected, a difference between the average value and a reference value is detected to adjust the signal level of the recorded test signal so that the difference reduces substantially to zero. If a drop-out is detected the average value is renewed by repeating the process of recording and reproducing the test signal.

9 Claims, 4 Drawing Figures

AUTOMATIC LEVEL ADJUSTMENT WITH MEANS FOR MINIMIZING DROP-OUT EFFECTS

BACKGROUND OF THE INVENTION

The present invention relates to automatic level setting of audio signals recorded on a magnetic tape according to the magnetic properties thereof.

The level of magnetically recorded signals is known to differ between magnetic tapes due to the differences in magnetic properties of the material of the tape. This would require the user to readjust the recording level whenever the tape is replaced.

Automatic level adjustment, shown and described in U.S. Pat. No. 4,220,979 assigned to the same assignee as the present invention, involves recording a test signal in a magnetic tape prior to the recording of audio signals and integrating the reproduced test signal to derive an average value of the amplitude of the test signal which reflects the magnetic properties of the tape. The average value of the test signal is checked against a reference to detect the difference between them to adjust the setting of a variable loss attenuator. Although the integration has the effect of smoothing insignificant variations of the reproduced signal to derive an accurate indication of the difference value, the occurrence of a drop-out would reduce the average value and hence an error would result.

SUMMARY OF THE INVENTION

It is therefore an object of the present invention to provide automatic level adjustment of magnetically recorded signals to compensate for differences in magnetic properties between tapes wherein the adjustment is free from errors resulting from drop-outs which might occur in the reproduced signal.

According to a broader aspect of the invention, a test signal is recorded in a magnetic tape prior to the recording of audio signals and reproduced to allow detection of an average value of the magnitude of the reproduced test signal. A drop-out in the reproduced signal is detected if it occurs during the process of deriving the average value. If the drop-out is not detected, a difference between the average value and a reference value is detected to adjust the signal level of the recorded test signal so that the difference reduces substantially to zero. If the drop-out is detected, the average value is renewed by repeating the process of recording and reproducing the test signal.

According to the specific aspect of the invention, the apparatus comprises a test signal source, a variable level setting means, means for applying the test signal through the level setting means to a recording head to record the level-adjusted test signal in a magnetic tape and reproducing the recorded signal, and means for detecting an average value of the magnitude of the reproduced signal. A detector is provided for detecting the presence and absence of a drop-out in the reproduced signal which affects said average value. A controller is responsive to the absence of the drop-out for detecting a difference between the average value and a reference value to adjust the level setting means and responsive to the presence of the drop-out for causing the average value detecting means to detect a new average value and detecting a difference between the new average value and the reference value for adjusting the level setting means according to the last-mentioned difference.

BRIEF DESCRIPTION OF THE DRAWINGS

The present invention will be described in further detail with reference to the accompanying drawings, in which.

DETAILED DESCRIPTION

Figure 1:
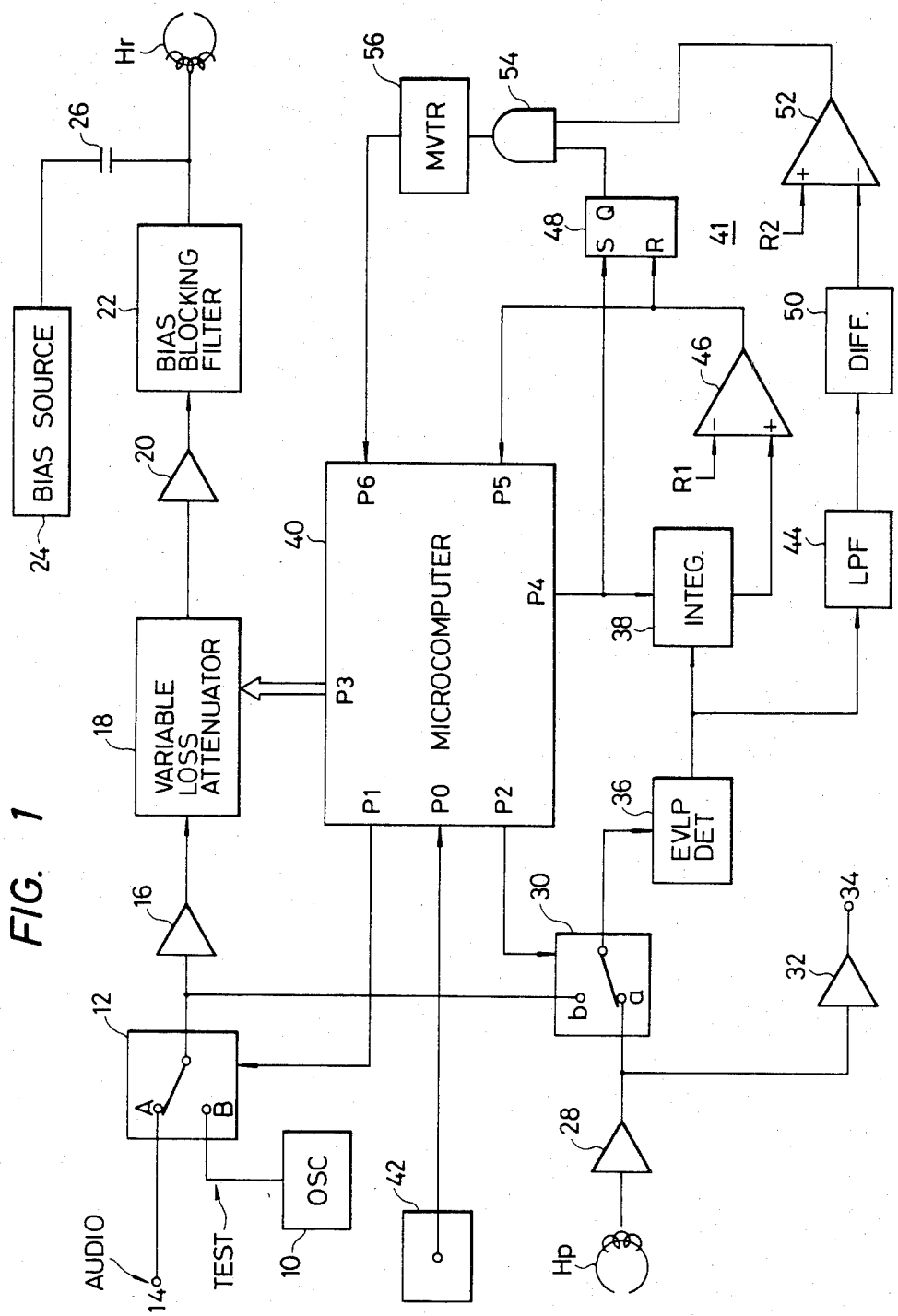
FIG. 1 is an illustration of a block diagram of a preferred embodiment of the present invention.

Referring now to FIG. 1, there is shown a preferred embodiment of the tape recording and reproducing apparatus of the present invention. The apparatus comprises a test signal source or oscillator 10 which generates a signal of constant amplitude and frequency in the audio spectrum. The test signal is applied to the B terminal of a first transfer switch 12. The terminal A of switch 12 is coupled to an audio input terminal 14 to which signals from microphones and other sources are applied. The transfer switch 12 is switched to the A position during normal "record" mode to supply the recording head Hr with the audio signal through a circuit which includes an amplifier 16, a variable loss attenuator 18, a power amplifier 20 and a bias blocking filter 22. In a well-known manner, a high frequency bias source 24 is coupled via an audio signal blocking capacitor 26 to the recording head Hr. The recorded signal is detected by a playback head Hp which is coupled by a preamplifier 28 to the a terminal of a second transfer switch 30 and also to a power amplifier 32 and thence to a terminal 34 to which headphones and speakers may be connected. The terminal b of the second transfer switch 30 is connected to the moving arm of the first switch 12 to receive the test signal when the apparatus is in a test mode. The moving arm of the second switch 30 is coupled to an envelope detector 36 to detect the envelope of the signal applied thereto.

The apparatus comprises a controller, preferably, a microcomputer 40 of any type available. The microcomputer 40 is provided for purposes of illustration with input ports P0, P5, and P6 and output ports P1, P2, P3 and P4. The input port P0 is connected to receive a start signal from a manual control panel 42 which is generated before level setting is made when a new magnetic tape is loaded. The output port P1 is coupled to the first transfer switch 12. When the port P1 is at low voltage level or logical "0" the switch 12 is in the A position to effect normal recording. The port P1 is at high voltage level or logical "1" in response to a logical "1" input to the port P0 to transfer the switch 12 to the position B to initiate a test mode. The output port P2 is coupled to the second transfer switch 30. When the port P2 is at logical "0", the switch 30 is in the position a to couple the signal from the playback head Hp to the envelope detector 36. As will be described later, when the port P2 is switched to logical "1" while the first switch 12 is in the B position the second switch 30 is transferred to the position b to supply the envelope detector 36 with the test signal. The output port P3 is connected to the variable loss attenuator 18 to set the amount of loss to be given to the input signal applied thereto. The attenuator 18 is of any conventional design which essentially comprises a plurality of resistors of different values and an analog multiplexer responsive to a binary control signal from the port P3 to couple the signal from amplifier 16 to one of the resistors.

The envelope detector 36 has its output coupled on the one hand to a resettable integrator 38 and on the other hand to a low-pass filter 44 which forms part of a drop-out detector 41. This low-pass filter serves to smooth the waveform of the detected signal by eliminating audio frequency components.

The integrator 38 is reset in response to a logical "1" level on the output port P4 of the microcomputer to generate a ramp voltage having a gradient which is variable as a function of the output of the envelope detector and hence as a function of the magnetic properties of the recording tape and as a function of the amount of loss introduced to the recording signal by the variable loss attenuator 18.

The ramp voltage from the integrator 38 is applied to the noninverting input of a comparator 46 of which the inverting input is coupled to a source providing a reference voltage R1. The output port P4 of the microcomputer is also connected to the set input of a flip-flop 48. The output of the comparator 46 is coupled to the reset input of the flip-flop 48 and also to the input port P5 of the microcomputer 40.

The drop-out detector 41 additionally includes a differentiator 50 coupled to the output of the low-pass filter 44, a comparator 52 which compares the output of the differentiator 50 with a reference voltage R2, and an AND gate 54 which is enabled by the flip-flop 48 to pass an output pulse from the comparator 52 to a monostable multivibrator 56. The output of the multivibrator 56 is coupled to the input port P6 of the microcomputer.

Figure 2:
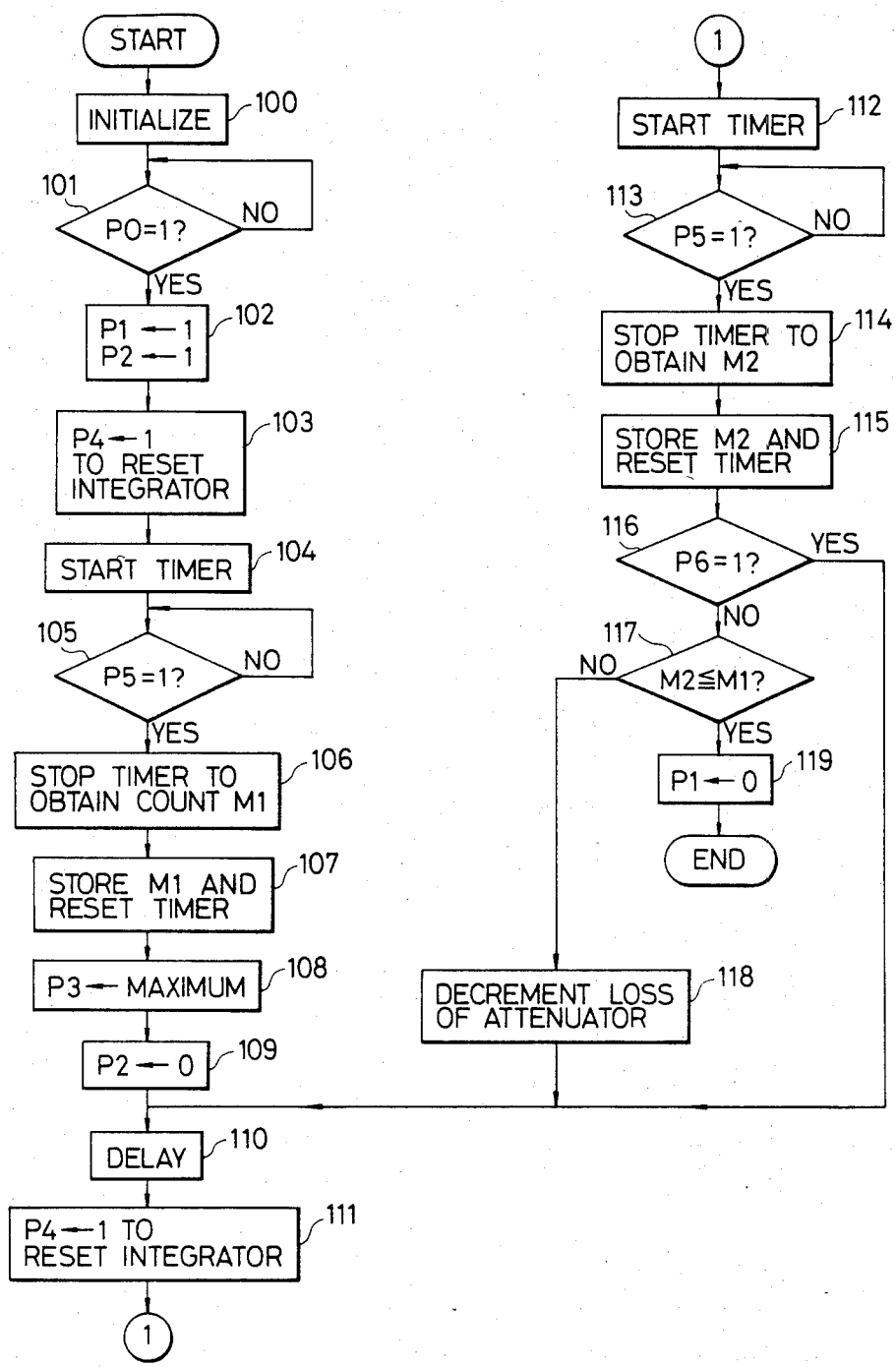
FIG. 2 is an illustration of a flow diagram associated with the microcomputer of FIG. 1.
Figure 4:
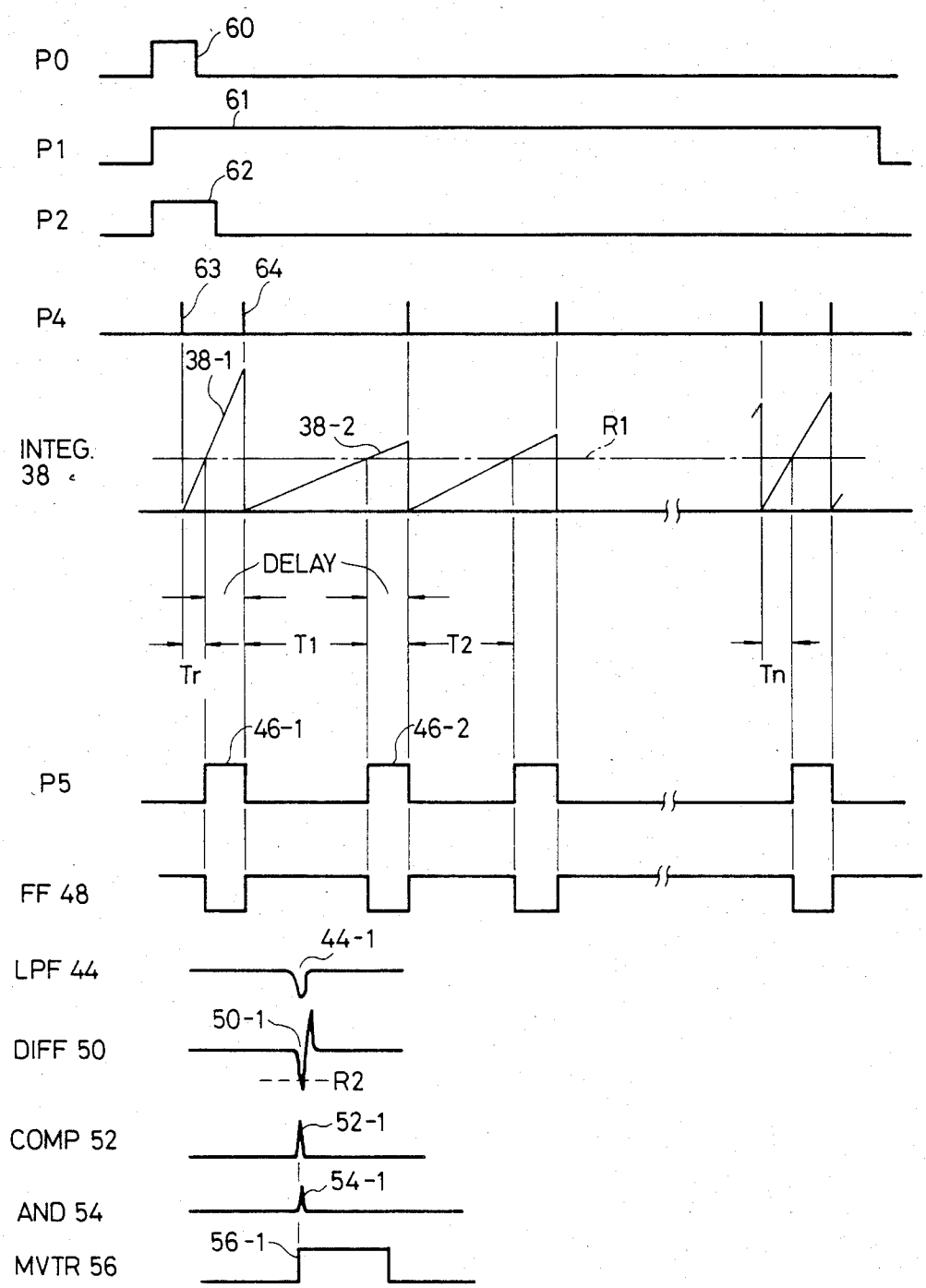
FIG. 4 is an illustration of a waveform diagram useful for describing the operation of the invention.

The operation of the apparatus will be understood as description proceeds with reference to FIGS. 2 and 4. When the apparatus is energized in response to the operation of a power switch, not shown, the microprocessor starts executing the programmed instructions from an initializing routine shown in a block 100 with which the various input and output ports and various components of the microcomputer are initialized. More specifically, the ports P1 to P6 are all set to logical "0". This permits the apparatus to operate in the normal recording mode in which the attenuator 18 is at minimum setting. The presence and absence of a test command signal 60 (FIG. 4) is checked in block 101 in which the microprocessor tests if port P0 is "1" and exits to a block 102 in the presence of P0=1. In the absence of P0=1 the block 101 is looped to monitor the occurrence of a test command signal.

In block 102, a logical "1" (61, 62, FIG. 4) is applied to ports P1 and P2 to transfer the first and second switches 12, 30 to the positions B and b, respectively. The test signal passes through the attenuator with a minimum loss to the recording head Hr to which the bias signal is also applied. The test signal is also applied to the envelope detector 36 through the second switch 30, so that the level of the non-recorded test signal is detected and applied to the integrator 38. In block 103, the microprocessor places a logical "1" to port P4 as indicated by a pulse 63 in FIG. 4 to reset the integrator 38, which results in a ramp voltage 38-1. This reset pulse also causes the microprocessor to start operating its built-in timer, or timing counter, in block 104. The ramp 38-1 reaches the threshold R1 within a period Tr and the comparator 46 generates a high voltage output 46-1 which changes the logical state of port P5 to "1". This logical state is detected in block 105 to stop the counting operation in block 106 to obtain a count value M1 representing to the period Tr. The count value M1 is stored in the random access memory in block 107. This count value M1 also represents the amplitude of the non-recorded test signal and is used as a reference with which the test signal which will be recorded and reproduced later is compared to detect coincidence between them.

In block 108, a binary code is applied to port P3 to establish a maximum setting in the attenuator 18 so that the test signal is recorded at a minimum level.

In block 109, a logical "0" is now placed on port P2 to transfer the second switch 30 to the a position to allow the envelope detector 36 to detect the amplitude of the test signal which has been recorded at the minimum level just described. For the envelope detector 36 to receive the recorded test signal at correct timing, a delay time is introduced in block 110 corresponding to the time during which the tape is moved from the recording head Hr to the playback head Hp. A reset pulse 64 is then generated in block 111 to reset the integrator 38 to generate a ramp voltage 38-2 and the timer is started in block 112. Since the recorded signal is at minimum level, the ramp 38-2 increases at a minimum rate and reaches the threshold R1 within a period T1 which is longer than any of the successive periods that follows in response to reset pulses. An output signal 46-2 is generated by comparator 46. The port P5 is raised to logical "1" and detected in block 113 to cause the timer to stop in block 114. A count value M2 representing the period T1 is obtained and stored in memory and the timer is reset to zero in block 115.

In block 116 the logical state of port P6 is checked for the presence of "1". In the absence of drop-outs in the reproduced test signal, port P6 remains at logical "0" level, and the microprocessor exits from block 116 to block 117 to detect whether the stored count M2 is equal to or smaller than the reference count M1. Since the count value M2 is initially larger than M1, a "no" decision route is taken to a block 118 where the attenuator 18 is decremented by a unit value to increment the recording level of the test signal. The program now returns to block 110 to repeat the above process.

Therefore, the recording level is successively increased and the count period decreases in steps as illustrated in FIG. 4. Each count value is checked against the reference count M1 until the former becomes equal to or smaller than the latter, whereupon a block 119 is executed to place a logical "0" to port P1 to transfer the first switch to the A position terminating the test mode. The attenuator 18 remains at the level of setting which is established during the last cycle of the repeated process. Since the magnetic properties vary between recording tapes, this setting level compensates for the difference in signal level between the non-recorded test signal and the recorded test signal. As a result, the recording level is optimized for the particular tape in which audio signals will be recorded in the normal record mode which follows. With the switch 12 being restored to the A position, the apparatus is now ready for normal recording operation.

Assuming that a drop-out occurs in the reproduced test signal during the counting operating of the timer, the count value M2 will be affected and it is impossible to provide correct setting for the attenuator 18. In this instance the output voltage of low-pass filter 44 drops sharply as at 44-1. This voltage drop is detected by the differentiator 50 producing a waveform 50-1 which is compared with threshold R2 in the comparator 52. A pulse 52-1 is generated from comparator 52 and applied to the AND gate 54. Since the AND gate 54 is enabled by the flip-flop 48 during the operation of the timer, the comparator output 52-1 is passed as a pulse 54-1 to the multivibrator 56 to cause it to generate a pulse 56-1, thus switching the port P6 to logical "1" level. Therefore, the microprocessor skips the block 117 to maintain the attenuator setting and exits to the block 110 to start over the previous test.

Figure 3:
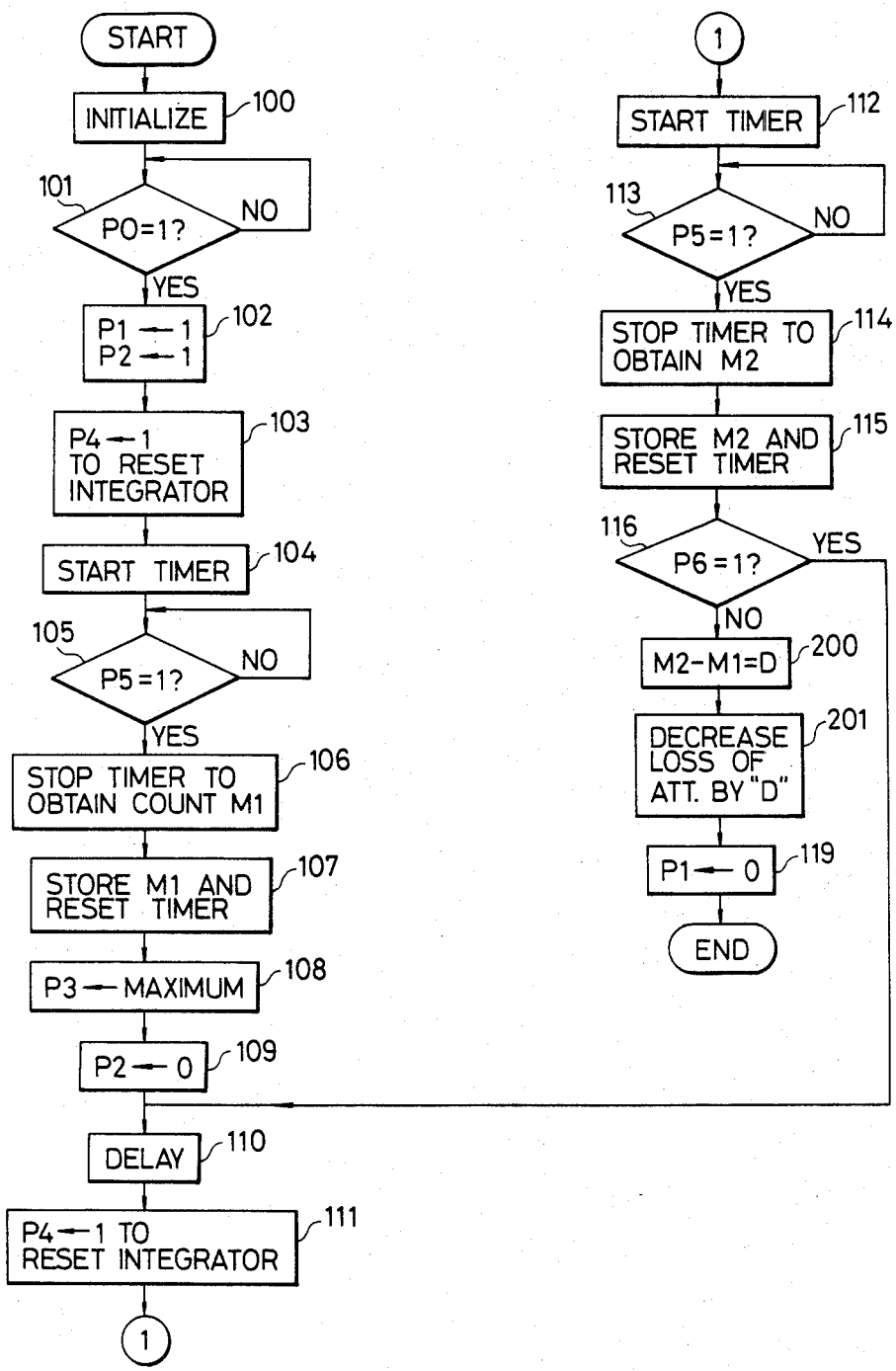
FIG. 3 is an illustration of a modification of the flow diagram of FIG. 2.

The microcomputer 40 may also be programmed to perform the program illustrated in FIG. 3 in which the same process steps as in FIG. 2 are indicated by the same numerals. The program of FIG. 3 differs from FIG. 2 in that, when a "no" decision is made in block 116 the microprocessor exits to a block 200, in which a difference D between the count values M2 and M1 is detected, and then exits to a block 201 to decrease the attenuator setting by an amount corresponding to the difference D to set the attenuator 18 to an optimum value.

What is claimed is:

1. A method for automatically setting the level of a signal to be recorded on a magnetic tape according to the magnetic properties thereof, comprising the steps of:
   (a) recording a test signal on said tape;
   (b) reproducing the recorded test signal;
   (c) integrating the reproduced test signal to generate a ramp voltage and detecting a drop-out in said reproduced signal and repeating steps (a) and (b);
   (d) if said drop-out is not detected, detecting a time period within which said ramp voltage varies from zero voltage level to a predetermined voltage level;
   (e) detecting a difference between said detected time period and a reference value; and
   (f) setting said signal level according to said difference.

2. A method as claimed in claim 1, wherein step (f) comprises the steps of varying the level of said signal in steps by a unit value and repeating steps (a) to (e) until the difference detected by step (e) substantially reduces to zero.

3. A method for automatically setting the level of a signal to be recorded on a magnetic tape according to the magnetic properties thereof, comprising the steps of:
   (a) integrating a test signal to generate a first ramp voltage and detecting a first time period within which said first ramp voltage varies from zero voltage level to a predetermined level;
   (b) recording the test signal on said tape;
   (c) reproducing the recorded test signal;
   (d) integrating the reproduced test signal to generate a second ramp voltage and detecting a drop-out in said reproduced signal to repeat steps (b) and (c);
   (e) if said drop-out is not detected, detecting a second time period within which said second ramp voltage varies from zero voltage level to said predetermined level;
   (f) detecting a difference between said first and second detected time period; and
   (g) setting said signal level according to said difference.

4. A method as claimed in claim 3, wherein step (g) comprises the steps of varying the level of said signal in steps by a unit value and repeating steps (b) to (f) until the difference detected by step (f) substantially reduces to zero.

5. Apparatus for automatically setting the level of a signal to be recorded on a magnetic tape according to the magnetic properties thereof, comprising:
   means for generating a test signal;
   level setting means;
   means for applying said test signal through said level setting means to a recording head to record the test signal on said tape and reproducing the recorded signal;
   a resettable integrator for integrating said reproduced test signal to generate a ramp voltage;
   means for detecting when said ramp voltage reaches a predetermined value;
   means for detecting the presence and absence of a drop-out in said reproduced signal; and
   control means for measuring the time period within which said ramp voltage varies from zero voltage level to said predetermined level, detecting a difference between said time period and a reference value in response to the detection of said absence and adjusting said level setting means according to said difference and resetting said integrator to re-generate said ramp voltage in response to the detection of said presence for readjusting said level setting means according to the last-mentioned difference.

6. Apparatus as claimed in claim 5, wherein said drop-out detecting means comprises a differentiator responsive to said reproduced test signal, and means for generating a signal when the output of said differentiator exceeds a predetermined value for allowing said control means to reset said integrator to regenerate a ramp voltage.

7. Apparatus as claimed in claim 6, wherein said control means comprises a microcomputer which is programmed to perform the following steps:
   (a) introducing a delay time in response to said test signal being recorded;
   (b) resetting said integrator at the termination of said delay time to cause said ramp voltage to be generated;
   (c) measuring the period of time taken for said ramp voltage to reach said predetermined value;
   (e) storing the measured time in a memory;
   (f) detecting an output signal from said drop-out detecting means indicating the presence and absence of the drop-out;
   (g) repeating the steps (a) to (f) in response to the output signal indicating the presence of the drop-out;
   (h) detecting the difference between said measured period of time and a reference period of time in response to the output signal indicating the absence of the drop-out; and
   (i) varying said level setting means according to said difference.

8. Apparatus as claimed in claim 7, wherein the step (i) comprises:
   (a) varying said level setting means in steps by a unit value; and
   (b) repeating the steps (a) to (g) until said difference is substantially reduced to zero.

9. A method for automatically setting the level of a signal to be recorded on a magnetic tape according to the magnetic properties thereof, comprising the steps of:
 (a) recording a test signal on said tape;
 (b) reproducing the recorded test signal;
 (c) detecting an average value of the magnitude of the reproduced test signal;
 (d) detecting a lower frequency component of the reproduced test signal;
 (e) differentiating the detected lower frequency component;
 (f) detecting whether the differentiated lower frequency component is lower than a predetermined threshold or not;
 (g) if said differentiated component is lower than said threshold, repeating steps (a) to (c);
 (h) if said differentiated component is not lower than said threshold, detecting a difference between said average value and a reference value; and
 (i) setting said signal level according to said difference.

* * * * *